US007865892B2

(12) United States Patent
Motoki et al.

(10) Patent No.: US 7,865,892 B2
(45) Date of Patent: Jan. 4, 2011

(54) PROGRAM, RECORDING MEDIUM, AND DEVICE FOR INSTALLING SOFTWARE

(75) Inventors: Toshiyasu Motoki, Zama (JP); Takamasa Hirata, Kodaira (JP)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 11/554,109

(22) Filed: Oct. 30, 2006

(65) Prior Publication Data
US 2007/0294688 A1 Dec. 20, 2007

(30) Foreign Application Priority Data
Nov. 21, 2005 (JP) .............................. 2005-336366

(51) Int. Cl.
*G06F 9/445* (2006.01)
*G06F 9/44* (2006.01)
(52) U.S. Cl. ................... 717/174; 717/175; 717/176; 717/178; 717/171; 717/173
(58) Field of Classification Search ......... 717/174–178, 717/168–173
See application file for complete search history.

(56) References Cited
U.S. PATENT DOCUMENTS
6,970,565 B1 * 11/2005 Rindsberg ................... 380/270

7,664,984 B2 * 2/2010 Wang et al. .................. 714/15

FOREIGN PATENT DOCUMENTS
| JP | 2003233512 | 8/2003 |
| JP | 2005229626 | 8/2005 |
| WO | 2004086168 A2 | 10/2004 |
| WO | 2005060388 A2 | 7/2005 |

OTHER PUBLICATIONS

Owen, et al. "Using Remote Installation Services for Windows to Streamline Installations in the UTPB Computer Science Research Lab", 2006, ACM, p. 301-307.*

IBM IP LAW, "Information Materials for IDS", Japanese Office Action dated Apr. 1, 2008, p. 1.

\* cited by examiner

*Primary Examiner*—Wei Y Zhen
*Assistant Examiner*—Qamrun Nahar
(74) *Attorney, Agent, or Firm*—Andrea L. Bauer; Hoffman Warnick LLC

(57) ABSTRACT

At the time of installing an installation-targeted OS in a computer, a supporting tool in a supporting medium carries out the following operations on the supporting tool OS. The operations include: storing information in a response file; copying a unique device driver and a DOS system file from the supporting medium to a hard disk; copying an installation file from the installation medium to the hard disk; and updating the installation file with a security patch file downloaded from the download server through a network. Thereafter, an installer is booted up from the DOS system file to install an OS by use of the response file, the unique device driver, and the installation file.

15 Claims, 8 Drawing Sheets

PROGRAM, RECORDING MEDIUM, AND DEVICE FOR INSTALLING SOFTWARE

BACKGROUND OF THE INVENTION

1. Field of the Invention

The present invention relates to a technology for installing software such as an operating system (hereinafter referred to as "OS") in a computer.

2. Related Art

Recently, extensive diffusion of the Internet and Intranet has caused a situation in which attacks through a network on devices connected to the network have been rapidly increased, and in which damages to network users have been expanded. Incidentally, many of such attacks through the network take advantage of security vulnerabilities (e.g., security holes), which are discovered in an already-released packaged product or the like. Unexposed security holes at the time of releasing the OS are discovered after the release to be a target for such attacks. At present, the OS is normally distributed with a recording medium such as a CD-ROM, and since it is considered that such a distribution method will not be changed in the future, attacks exploiting security holes will also be unending.

In view of the aforementioned situation, it is a general practice for an OS vendor to provide a security patch for solving a security problem with the OS, which is discovered after release. That is, each user downloads a necessary security patch from a download server prepared by the vendor of the OS which the user uses, and applies the security patch to the OS of the user. Here, the security patch is defined as a correction module against security holes. In general, software is configured by a plurality of modules, and the problem is solved by applying the correction module to a module with a problem therein.

However, when a security patch is applied after the released OS is installed in the computer, the computer is initially connected to the network with the OS having a security problem. At this time, therefore, there is a possibility of the computer being attacked through the network.

Consequently, it has been suggested that a recording medium, to which a security patch has been already applied, be prepared as a recording medium for installing the OS (hereinafter referred to as "installation medium"), and that this be used for installing the OS (see, for example, Daniel Petri, "MCSE world Windows 2000/XP SP Slipstreaming," December 2004, and Kunihiro Saitoh, "Distribution of Windows 2000 SP4 Japanese version starts," Jul. 3, 2005, Nikkei Windows pro, hereinafter respectively referred to as "Petri" and "Saitoh."

In Petri, the user downloads the security patch in advance, and the installation medium, to which the security patch has been already applied, is created by the user. Specifically, an installation CD as one example of the installation medium is created through the following procedures.

1. The security patch of the OS to be installed is downloaded through the Internet in advance.
2. All of files in commercially available installation CD for the OS to be installed are copied on a hard disk or the like.
3. The files copied in the above-described procedure 2 are overwritten by the file of the security patch downloaded in the above-described procedure 1.
4. All of the files are written in a recording medium such as a CD-R to create a bootable CD.

In Petri, a system, to which a security patch has been already applied, is needed in addition to a system targeted to be installed, in order for a user to download a security patch. In addition, there is a problem in that procedures at the time when the user actually creates an installation CD is very cumbersome, and that CD-R writing environment is necessary.

In addition, there has been disclosed, in Saitoh, a service where the vendor of the OS distributes the installation medium to which a security patch has been already applied.

In addition, in Saitoh, it takes time for an installation medium, to which a latest security patch is applied by a vendor, to be delivered to the user. Security problems are often discovered, and security patches to resolve such problems are accordingly provided in a short period of time. For this reason, there is a problem that the installation medium delivered to the user is not always the installation medium to which a latest security patch is applied.

On the other hand, there is a technology which is based on the premise that the OS is installed before a security patch is applied (see, for example, Tetsu Yamato, "Considering countermeasures to new virus, (8) promotion for application of security update patch (first part)," Dec. 12, 2003, Internet Watch, hereinafter referred to as Yamato.

In Yamato, there is disclosed that the OS is installed by using an installation medium (such as a recovery CD) to which the security patch has not been applied at all. Thereafter, the security patch is applied while an access from outside is blocked by a personal firewall. Furthermore, Yamato merely discloses general procedures for applying the security patch after the OS is installed. With these procedures, when the OS does not initially include a personal firewall after installment, the personal firewall needs to be purchased separately to be installed. Thereafter, the user sets up the personal firewall. However, the setting depends on the OS, and considerable amount of technical knowledge is needed to set up the personal firewall correctly. Accordingly, there is a problem that the computer is connected to the network unintentionally before the personal firewall is set up, or that there is a possibility of being attacked through the network due to a wrong setting.

It should be noted that a similar problem can be caused not only when the OS is installed but also general software other than the OS is installed.

SUMMARY OF THE INVENTION

As described above, there are various kinds of technologies for installing the OS by a method with which attacks through a network are not received. The present invention has been made to solve the above-described technical problems.

An object of the present invention is to cause installed software to be in a latest state immediately after installation even in a case where the software is installed by use of an installation medium which is not in a latest state.

In addition, another object of the present invention is to cause the installed software to be in the latest state immediately after installation without using another computer with no security problems, or without the user's conscious carrying out of special operations.

In consideration of such objects, the present invention is configured so that OS installation is actually started after an OS installation supporting tool downloads information on update of the data from the network. With the update information, the installation supporting tool updates files needed for OS installation to be in the latest state. In this event, when a program for operating the supporting tool is considered as a first program of the present invention, this first program actuates the following two functions. A first function operates a second OS prior to installation of a first OS targeted to be installed. In addition, a second function is a function which carries out the following procedures on the second OS. The procedures include: acquiring data to be used for installing the first OS from a recording medium; downloading the update information, which is related to the data, through a network; and causing the data to be in the latest state based on the update information.

It should be noted that the first OS and the second OS are used here to merely distinguish the OS targeted to be installed and the OS operating the supporting tool, and the first OS and the second OS can be the same kind of OS. That is, for example, a configuration can be that in which the supporting tool is operated on Linux (registered trademark) when Linux is installed.

Moreover, the present invention is configured so that the OS installation supporting tool starts actual installation after the security patch is downloaded from the network, and a file needed for OS installation is replaced with the security patch so as to be in a state with no security problems. In this case, in the above-described first program, it can be understood that a program for operating the supporting tool is that in which the update information includes a security patch for correcting the security problem of the first OS.

Moreover, the present invention is configured so that the security patch is downloaded in a secured state in which the OS installation supporting tool does not allow attacks to come through the network. In this case, in the second function actuated by the above first function, it can be understood that a program for operating the supporting tool performs a process of downloading the security patch after the network is caused to be in a secured state.

Furthermore, the present invention can be understood as a program for actually installing the OS after a file needed for OS installation is caused to be in the latest state. In this case, the program can be understood as a program for further implementing a function in which the above-described first program installs the first OS in the computer by use of the data in the latest state.

In addition, the present invention can be understood as not merely a supporting program for OS installation but also a supporting program for general software installation. In this case, the second program of the present invention implements the following three functions in the computer. A first function is that of retrieving data, which is used for software installation, from a recording medium. A second function is that of causing the network connected with a device holding the update information relating to the data to be secured before the update information is downloaded through the network. Moreover, a third function is that of causing the data to be in the latest state based on the update information prior to software installation.

Furthermore, the present invention can be understood as a recording medium in which a program for operating the OS installation supporting tool or the like is recorded. In this case, the recording medium of the present invention records a first program for installing the OS in the computer, a second program for supporting the OS installation, and data used for installing the OS. The second program implements the following two functions. A first function is that of operating a different OS prior to OS installation. In addition, a second function is that of performing the following procedures on the different OS. The procedures include: downloading the update information, which is related to data used for OS installation, through the network; and causing the data to be in the latest state based on the update information.

It should be noted that the first OS and the second OS are used here to merely distinguish the OS targeted to be installed and the OS operating the supporting tool, and the first OS and the second OS can be the same kind of OS. That is, for example, a configuration can be that in which the supporting tool is operated on Linux when Linux is installed.

In addition, the present invention can be understood as a device for supporting OS installation. In this case, the device of the present invention includes an acquiring unit for retrieving data, which is used for software installation, from a recording medium, a receiving unit for receiving the update information through the network after the network, which is connected with the device holding the update information relating to the data, is caused to be the secured state, and an updating unit for causing the data to be in the latest state based on the update information.

According to the present invention, installed software is in a latest state immediately after installation even in a case where the software is installed by use of an installation medium which is not in the latest state.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE INVENTION

Although an embodiment of the present invention is described below in detail, it should be understood that various changes, substitutions and alternations can be made therein without departing from spirit and scope of the invention as defined by the appended claims.

Figure 1:
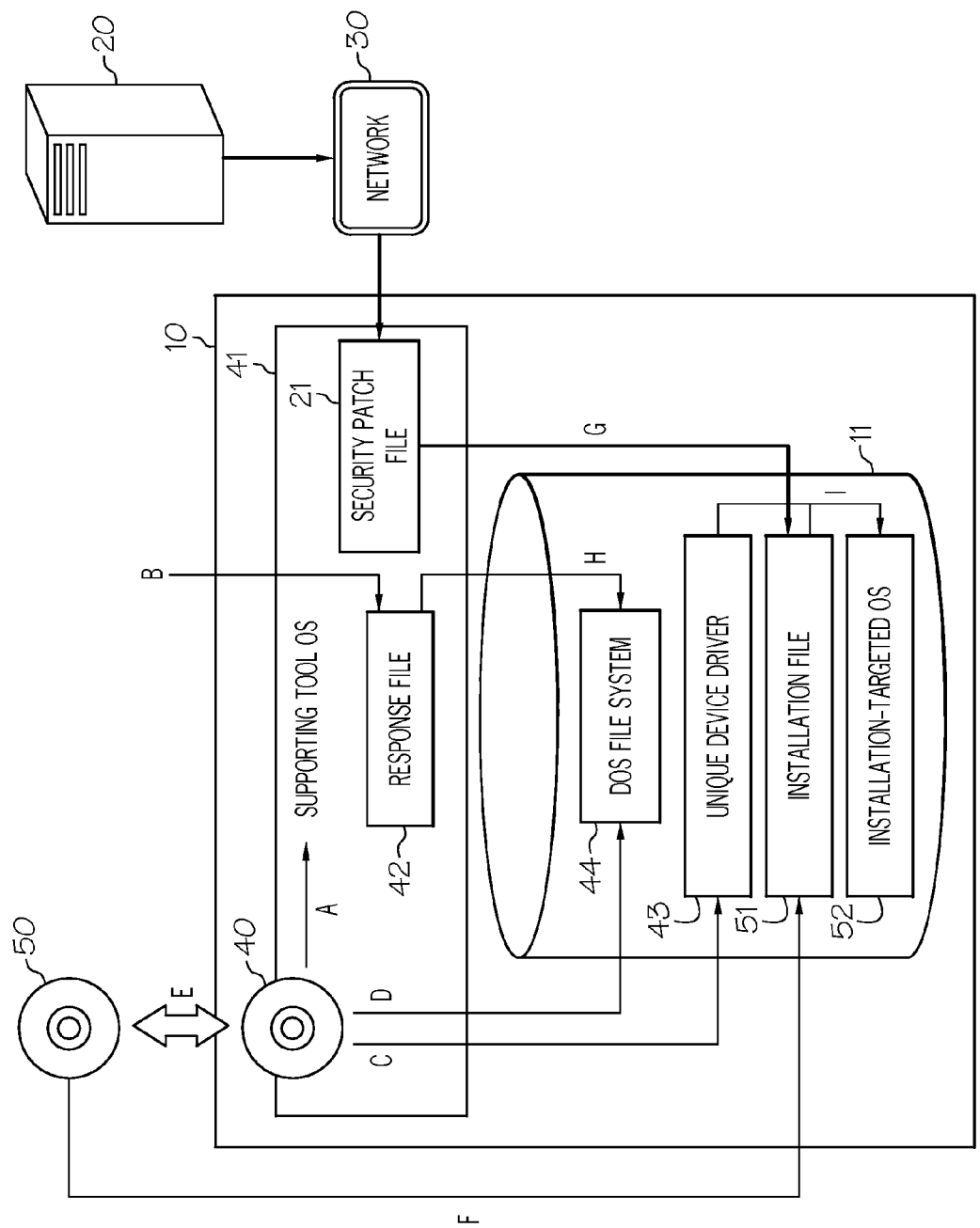
FIG. 1 is a diagram schematically showing an embodiment of the present invention.

FIG. 1 is a diagram schematically showing the present embodiment. As shown in FIG. 1, the present embodiment is applied to a computer system in which a computer 10, in which an OS is installed, and a download server 20 holding a security patch for the OS are connected with each other through a network 30 such as the Internet. It should be noted that the computer 10 has a hard disk 11 for recording various kinds of data needed for installing and operating the OS.

Incidentally, in a relatively low-end server system, a tool for supporting installation operated by the OS for the system (hereinafter referred to as "supporting tool") is often provided. For example, in "eServer xSeries" of IBM Corporation, a bootable CD of the supporting tool, which is called "ServerGuide", is enclosed. Such a supporting tool sets up hardware options, which are unique to the system, updates BIOS/firmware or the like, installs a driver, which is optimum for the system, and the like. In particular, such a supporting tool is often used by users in small-scale business establishments and the like, to whom the system is introduced for the first time.

For this reason, by use of such a supporting tool, the present embodiment makes it possible to performing a process for solving OS security problems which may occur at the time when the OS is installed.

Operations of the system will be briefly described below.

First, an OS 41 for operating the supporting tool (hereinafter referred to as "supporting tool OS") is activated from a recording medium 40 in which a program operating as the supporting tool is recorded (hereinafter referred to as "supporting medium") (A). This supporting tool operates on the supporting tool OS 41 as follows.

Specifically, the supporting tool first receives information inputted by a user, and stores the information in a response file 42 (B). Meanwhile, the supporting tool copies, from the supporting medium 40, a device driver 43, which is unique to the computer 10, or the like (specific device diver), to the hard disk 11, (C) and copies a DOS system file 44 to the hard disk 11 (D).

Next, the user pulls out the supporting medium 40, and inserts an installation medium 50 (E). With this, the supporting tool copies, from the installation medium 50, a file 51, which is needed for installing an OS (installation file), to the hard disk 11 (F). In addition, in the present embodiment, a network 30 is caused to be in a secured state before a security patch file 21 is downloaded from a download server 20 through the network 30, and a file included in the installation file 51 is replaced as needed (G).

Subsequently, the supporting tool starts OS installation. That is, the computer 11 is rebooted first to run DOS from a DOS system file 44. Then, an OS installer (not shown) is activated on the DOS. Note that the OS installer can be copied from the supporting medium 40 or from the installation medium 50.

Moreover, at this time, the supporting tool passes the response file 42 to the installer (H). With this, the installer completes OS installation by use of information in the response file 42, the unique device driver 43, and the install file 51 (I). That is, an environment for installation-targeted OS 52 is created in the hard disk 11.

More detailed descriptions of the present embodiment will be given below.

Figure 2:
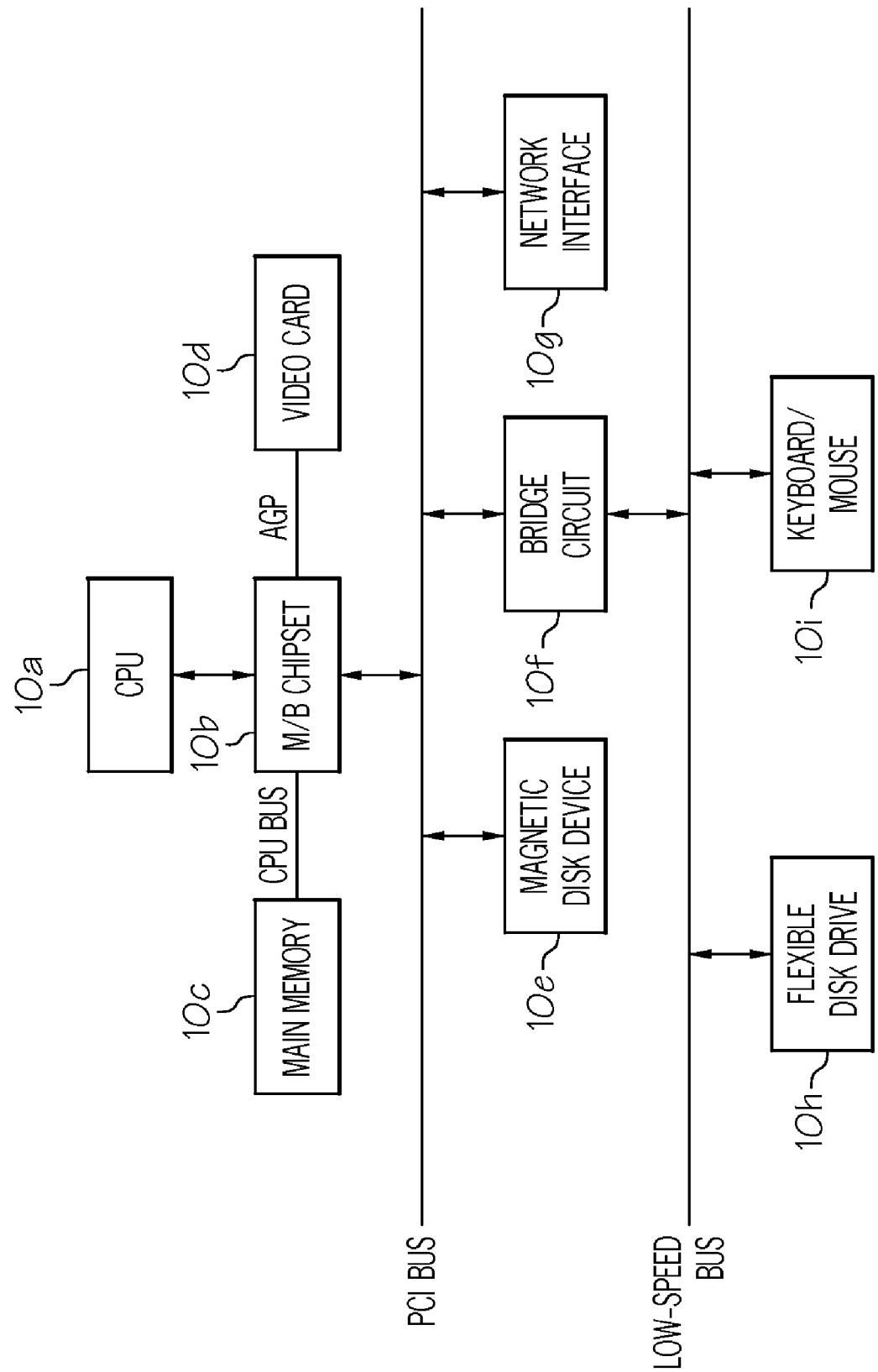
FIG. 2 is a block diagram showing one example of hardware configuration of a computer according to the embodiment of the present invention.

FIG. 2 is a diagram schematically showing an example of a computer hardware configuration, which is suitable for being used as the computer 10 of the present embodiment.

The computer shown in FIG. 2 includes a central processing unit (CPU) 10a, which is a calculation means, a main memory 10c connected to the CPU 10a through a motherboard (M/B) chip set 10b and a CPU bus, and a video card 10d also connected to the CPU 10a through the M/B chip set 10b and accelerated graphics port (AGP). In addition, a magnetic disk device (HDD) 10e and a network interface 10g are included. The HDD 10e is connected to the M/B chip set 10b through a peripheral component interconnect (PCI) bus. Furthermore, a flexible disk drive 10h and a keyboard/mouse 10i are included. The flexible disk drive 10h is connected to the M/B chip set 10b through the PCI bus, a bridge circuit 10f, and a low-speed bus.

It should be noted that FIG. 2 merely shows an example of a computer hardware configuration which implements the present embodiment, and various kinds of other configurations are made possible as long as the embodiment of the present invention is applicable. For example, it is made possible to have a configuration in which, instead of providing the video card 10d, a video memory alone is mounted to process image data in the CPU 10a. Alternatively, as an internal recording device, a dive for a compact disc recordable (CD-R) or digital versatile disc random access memory (DVD-RAM) can be provided through an interface such as ATAttachment (ATA) and small computer system interface (SCSI).

Figure 3:
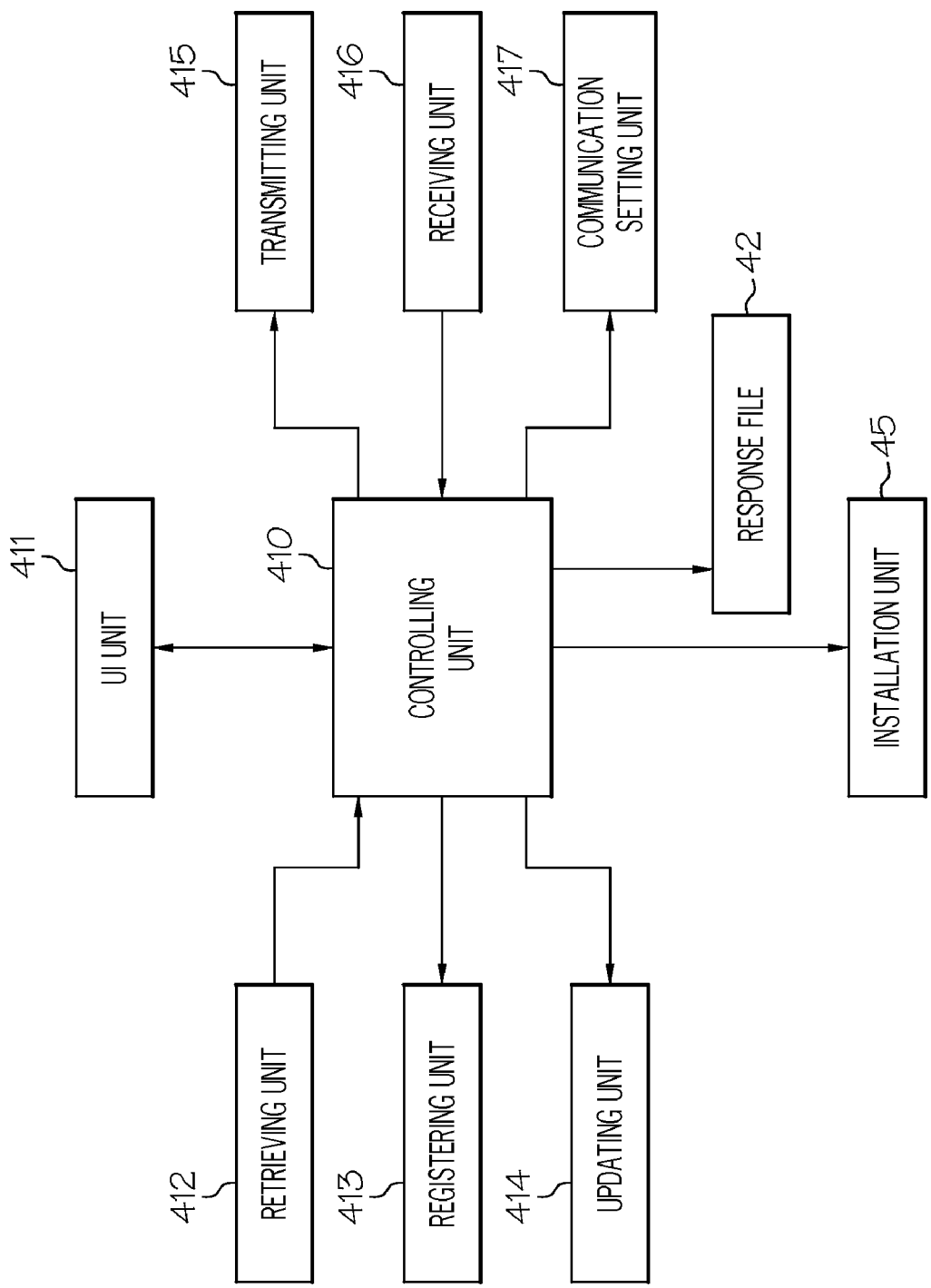
FIG. 3 is a block diagram showing functional configuration of the computer according to the present embodiment of the present invention.

In addition, FIG. 3 is a drawing showing an example of a functional configuration implemented in the computer 10 (see FIG. 1) at the time of installing the OS according to the present embodiment.

As shown in FIG. 3, the computer 10 implements a controlling unit 410, a UI unit 411, a retrieving unit 412, a registering unit 413, an updating unit 414, a transmitting unit 415, a receiving unit 416, a communication setting unit 417, a response file 42, and an installing unit 45.

The controlling unit 410 controls each functional unit, and concurrently stores information in the response file 42 and runs the installing unit 45. The UI unit 411 instructs a user to input information, and retrieves the inputted information. The retrieving unit 412 retrieves a file from a recording medium. The registering unit 413 writes, as a new file, the file retrieved from the recording medium on the hard disk 11 (see, FIG. 1). The updating unit 414 replaces the file in the hard disk 11 (see, FIG. 1) with a file downloaded through the network 30. The transmitting unit 415 transmits data through the network 30. The receiving unit 416 receives the data through the network 30. In particular, the transmitting unit 416 downloads a security patch from the download server 20. In addition, the communication setting unit 417 automatically carries out various kinds of setting with regard to data communications by the transmitting unit 415 and the receiving unit 416.

Furthermore, as described above, the response file 42 is a file for temporarily storing information which should be passed to the OS to be installed. In addition, the installing unit 45 is a function implemented by an OS installer, and actually installs the OS.

It should be noted that each of the functions of the controlling unit 410, the UI unit 411, the retrieving unit 412, the registering unit 413, the updating unit 414, the transmitting unit 415, the receiving unit 416, and the communication setting unit 417 are implemented by operations of a supporting program in the supporting medium 40. Specifically, the above functions are implemented when a CPU, of the computer 10 expands the supporting program from the supporting medium 40 to a memory, and the expanded supporting program is read to be executed.

Meanwhile, the installer, which implements the installing unit 45, can be expanded to the memory from the supporting medium 40 or from the installation medium 50.

Next, specific descriptions will be provided for operations of the present embodiment. In this event, a case, in which "ServerGuide" of IBM Corporation is used as a supporting tool, and in which Windows (registered trademark) is installed, is taken for an example. It should be noted that "ServerGuide" is a GUI tool, which run in Linux (registered trademark), and which is operated by Java (registered trademark) on a window manager of Linux. "ServerGuide" operates on a CD-ROM and RAM disk. Accordingly, the OS for the supporting tool will be described below as Linux. In addition, a CD is used as the supporting medium 40 and the installation medium 50, and the supporting medium 40 and the installation medium 50 in this case are referred to as "supporting CD" and "installation CD", respectively.

Figure 4:
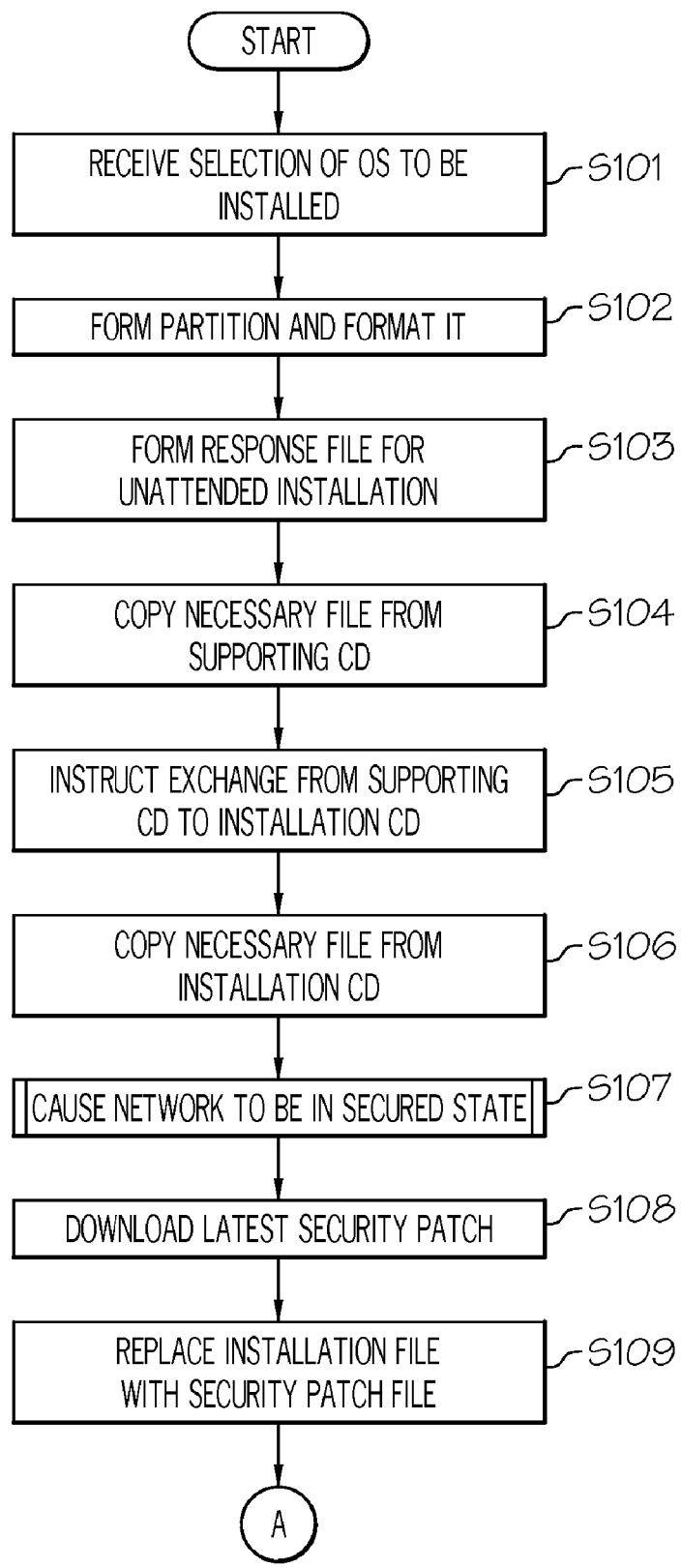
FIG. 4 is a flowchart showing operations before installation of a supporting tool OS is started according to the embodiment of the present invention.
Figure 5:
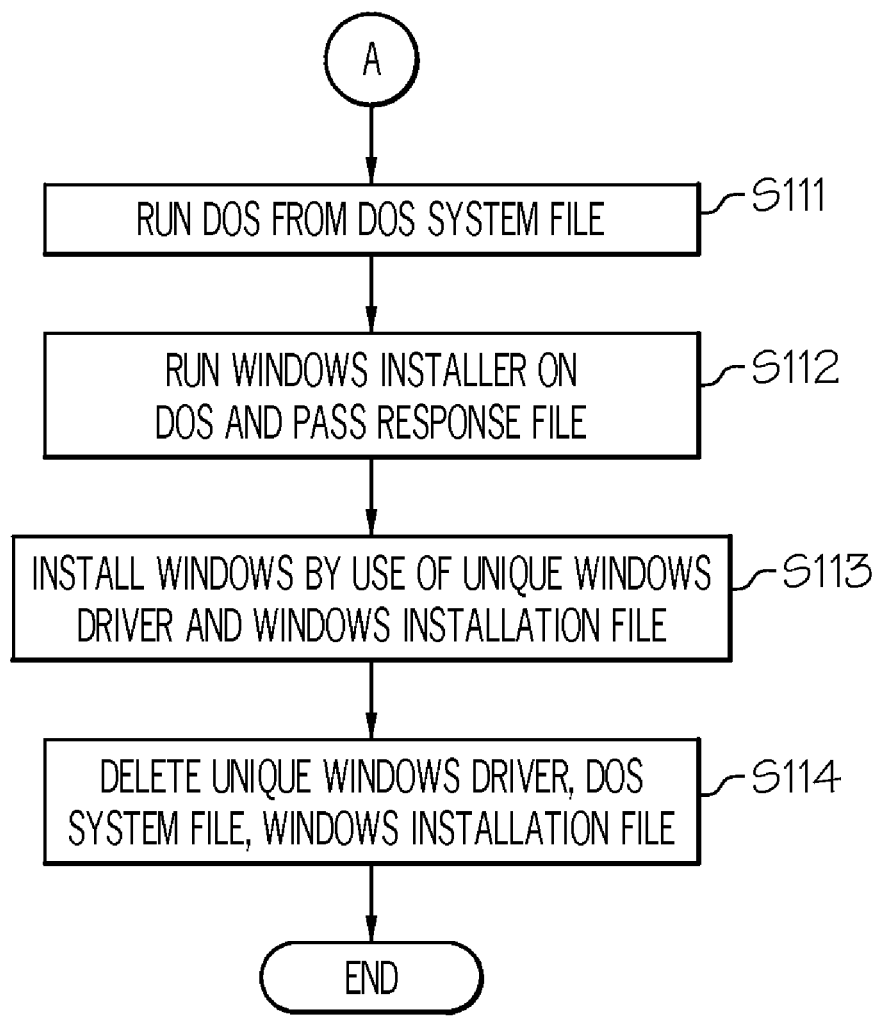
FIG. 5 is a flowchart showing operations at the time of installing the supporting tool OS according to the embodiment of the present invention.

FIGS. 4 and 5 are flowcharts showing one example of operations of the supporting tool according to the present embodiment. However, steps, which are not directly related to the invention, are omitted. Moreover, the operations of the supporting tool will be described below as operations by the respective functions of the computer 10, the functions being implemented by the supporting tool. In this case, each of functional units other than the controlling unit 410 operates under a control of the controlling unit 410. To simplify the descriptions, however, the fact that each of the functional units operates under the control of the controlling unit 410 is not referenced for each case.

First, by referring to FIG. 4, descriptions will be provided for operations of the supporting tool before starting OS installation.

When the user boots the computer 10 from a bootable CD of the supporting tool, the supporting tool starts operations thereof. Then, the UI unit 411 first prompts the user to select an OS to be installed. When the user selects the OS in response to the prompt, the UI unit 411 receives the selection (step 101). At this time, the user can select, for example, Windows 2000 or Windows Server 2003.

Subsequently, the controlling unit 410 deletes a partition of the hard disk 11. Thereafter, a new partition is formed to be formatted. (step 102). Incidentally, in this event, NT File System (NTFS) or File Allocation Table 32 (FAT32), for example, can be used as a file system.

Moreover, the controlling unit 410 forms the response file 42 for unattended installation (step 103). Here, since an OS targeted to be installed is Windows, "Unattended.txt", which is passed at a later step to Windows installer (WINIST.EXE), is created. Specifically, the response file 42 is formed in the following manner. That is, the UI unit 411 first prompts the user to input information needed for installing Windows. The information needed for the installation includes a computer name, a Windows product key, a network setting, a license mode, a time zone, components to be installed, and the like. When the user inputs the information in response to the prompt, the UI unit 411 retrieves the information, and returns the information to the controlling unit 410. The controlling unit 410 then stores the information in the response file 42.

Next, the retrieving unit 412 retrieves the necessary file from the supporting CD, and passes the file to the controlling unit 410. After that, the registering unit 413 writes the file in the partition formatted at step 102 (step 104). In this event, a specific device driver 43 (a Windows driver specific to the computer 10, or the like) and a DOS system file 44 are considered as the necessary files. In the present embodiment, it is supposed that, at the time of the above operations, a Windows installer (WININST.EXE), which operates on DOS, is also retrieved to be written on the hard disk 11.

Thereafter, the UI unit 411 instructs the user to replace the supporting CD with the installation CD (step 105). Thus, the user pulls out the supporting CD, and inserts a commercially available Windows installation CD.

Hence, the retrieving unit 412 retrieves the Windows installation file from the Windows installation CD. Subsequently, the registering unit 413 writes the file in the partition formatted at step 102 (step 106).

Incidentally, in the present embodiment, the following process for solving security problems is performed after the above-described processes. The following process is also carried out on Linux in a similar manner to that of the above-described processes.

Specifically, the communication setting unit 417 first performs a set up for causing a network to be in a secured state (step 107).

In this manner, the network is caused to be in the secured state before the transmitting unit 415 requests the download server 20 to transmit a security patch file 21 and the receiving unit 416 receives the transmitted security patch file 21 (step 108).

Thereafter, the updating unit 414 replaces the installation file with the security patch file 21 for the corresponding security patch file 21, which is newer than the installation file copied at step 106 (step 109).

Note that the security patch file is generally provided in a format capable of replacing an individual installation file. For example, in a Windows service pack, an installation file can be replaced in the following manner.

First, it is supposed that the receiving unit 416 obtains "Windows 2000 Service Pack 4 network install" (module name: W2Ksp4.exe) from the download center of Microsoft Corporation (http://www.microsoft.com/japan/default.asp).

In this case, the updating unit 414 subsequently issues a command of "W2Ksp4-x" to expand the service pack module. Incidentally, "-x" indicates an option in which expansion alone is carried out without installing the service pack. Here, it is supposed that the service pack module is expanded under a directory of "c:¥w2k_sp4".

Moreover, the updating unit 414 copies all of the files and directories in the installation CD of Windows 2000 to the hard disk 11. Here, it is supposed that the files and directories are copied under a directory of "c:¥w2k".

In this state, the updating unit 414 inputs a command of "cd ¥w2k_sp4¥i386¥update," and then inputs a command of "update.exe-s:c:¥w2k", so that the Windows installation CD file can be replaced with the file of the service pack.

When the above-described processes are completed, the user pulls out the Windows installation CD, and a process proceeds to actual Windows installation.

Next, by referring to FIG. 5, descriptions will be provided for operations of the supporting tool at the time of OS installation.

First, the controlling unit 410 reboots the computer 10, and runs a DOS from the DOS system file 44 copied at step S104 (step 111).

Subsequently, the controlling unit 410 runs the Windows installer (WININST.EXE), which is copied at step 104, on the DOS. As a result, the Windows installer functions as the installing unit 45. Thus, the response file 42 (Unattend.txt) formed at step 103 is passed to the installing unit 45 (step 112).

After that, the installing unit 45 automatically completes Windows installation while using the unique device driver 43 (such as Windows driver unique to the computer 10) and the Windows installation file 51 (step 113).

Finally, the controlling unit 410 deletes the unique device driver 43, the DOS system file 44, and the installation file 51, and causes the computer to be booted from the installed Windows from the next start-up (step 114).

Note that the above operations are made under DOS environment. Subsequently, installed Windows is activated when the computer 10 is rebooted.

Figure 6:
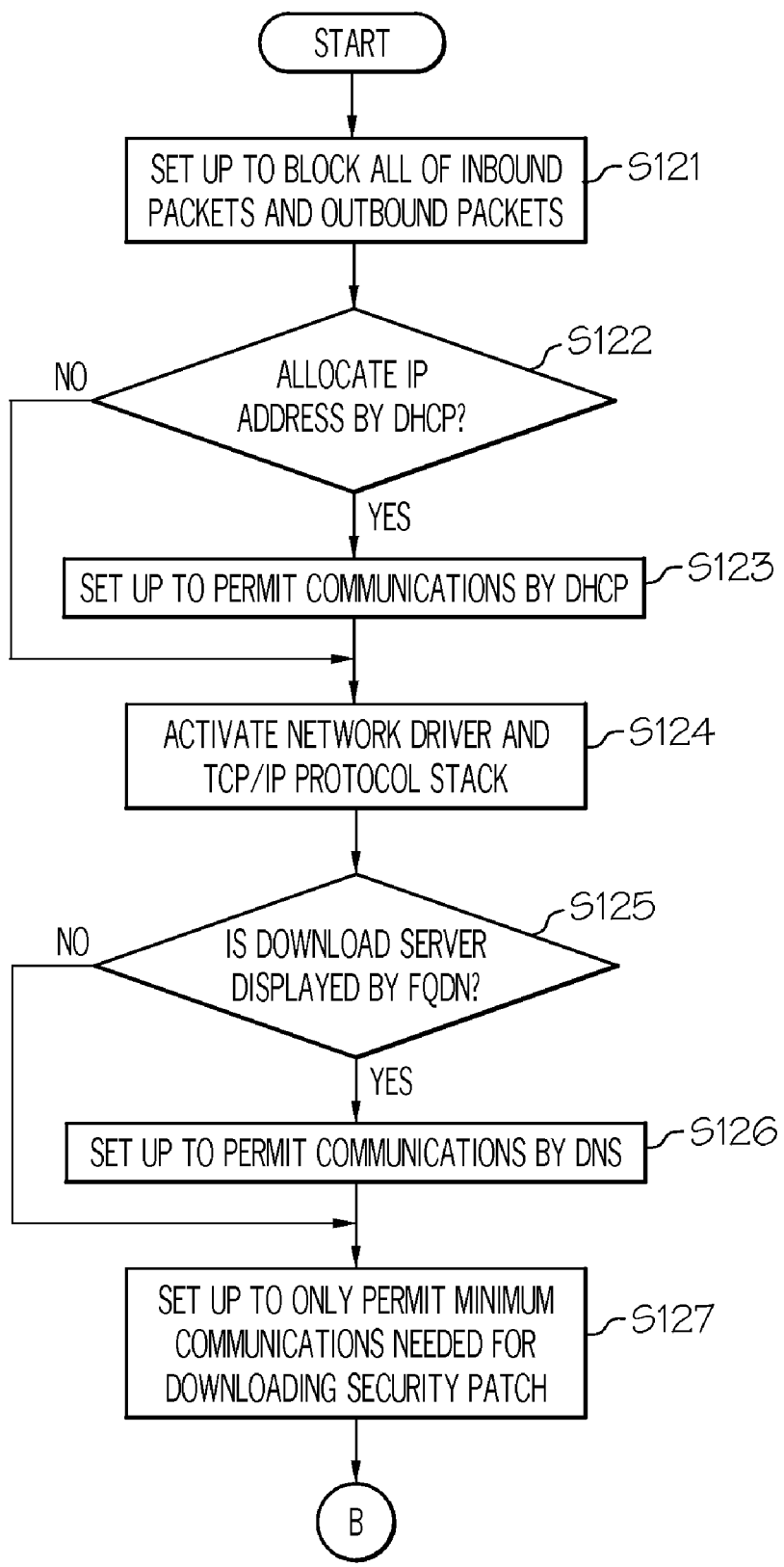
FIG. 6 is a flowchart showing detailed operations at the time when the supporting tool of the embodiment according to the present invention causes a network to be in a secured state.

Next, by referring to FIGS. 6 and 7, a process at step 107 of FIG. 4 will be described in detail.

As described above, step 107 of FIG. 4 is for a process of ensuring the secured state in order to block attacks through the network.

First, the communication setting unit 417 sets up the computer so that all of inbound network packets (packets from outside to inside) and outbound network packets (packets from inside to outside) are blocked (step 121).

However, in a case where the setting is such that an IP address is allocated to the computer 10 by Dynamic Host Configuration Protocol (DHCP) (Yes at step 122), the setting is made so that only communications by DHCP is permitted (step 123).

Thereafter, the communication setting unit 417 activates the network disk driver and TCP/IP protocol stack (step 124).

However, in a case where the download server 20 is represented not by the IP address but by Fully Qualified Domain Name (FQDN) (Yes at step 125), the setting is made so that only communications by DNS protocol is permitted (step 126).

Incidentally, steps 121, 123, and 126 can be implemented by using an existing technology of packet filtering. For example, in a case of Linux, the packet filtering can be easily implemented by using Netfilter (iptables). In this case, the packet filtering is carried out by the protocol stack inside kernel, and is carried out without a daemon process in a user space. The packet filtering can be carried out in a network layer, a protocol layer and a data link layer.

Subsequently, the communication setting unit 417 carries out setting in which only minimum communications, which is needed for secured download of files at step 108 of FIG. 4, is permitted (step 127).

For example, in a case where SSH File Transfer Protocol (SFTP) operating on SSH2 is used, the setting is made so that only the following packets are permitted. Incidentally, it is supposed that the IP address of the download server 20 (IP address or FQDN) is known in advance.

Outbound network packets to a port 22 of the download server 20, and

Inbound network packets to an arbitrary port of the computer 10 (although the port can be specified, the port No. 1024 or more is desirable).

Thereafter, to prevent spoofing the IP address and the FQND, authentication and encryption of a session are carried out between the computer 10 and the download server 20. This procedure can be implemented by using SFTP or the like, which operates on the existing technology of SSH2.

Figure 7:
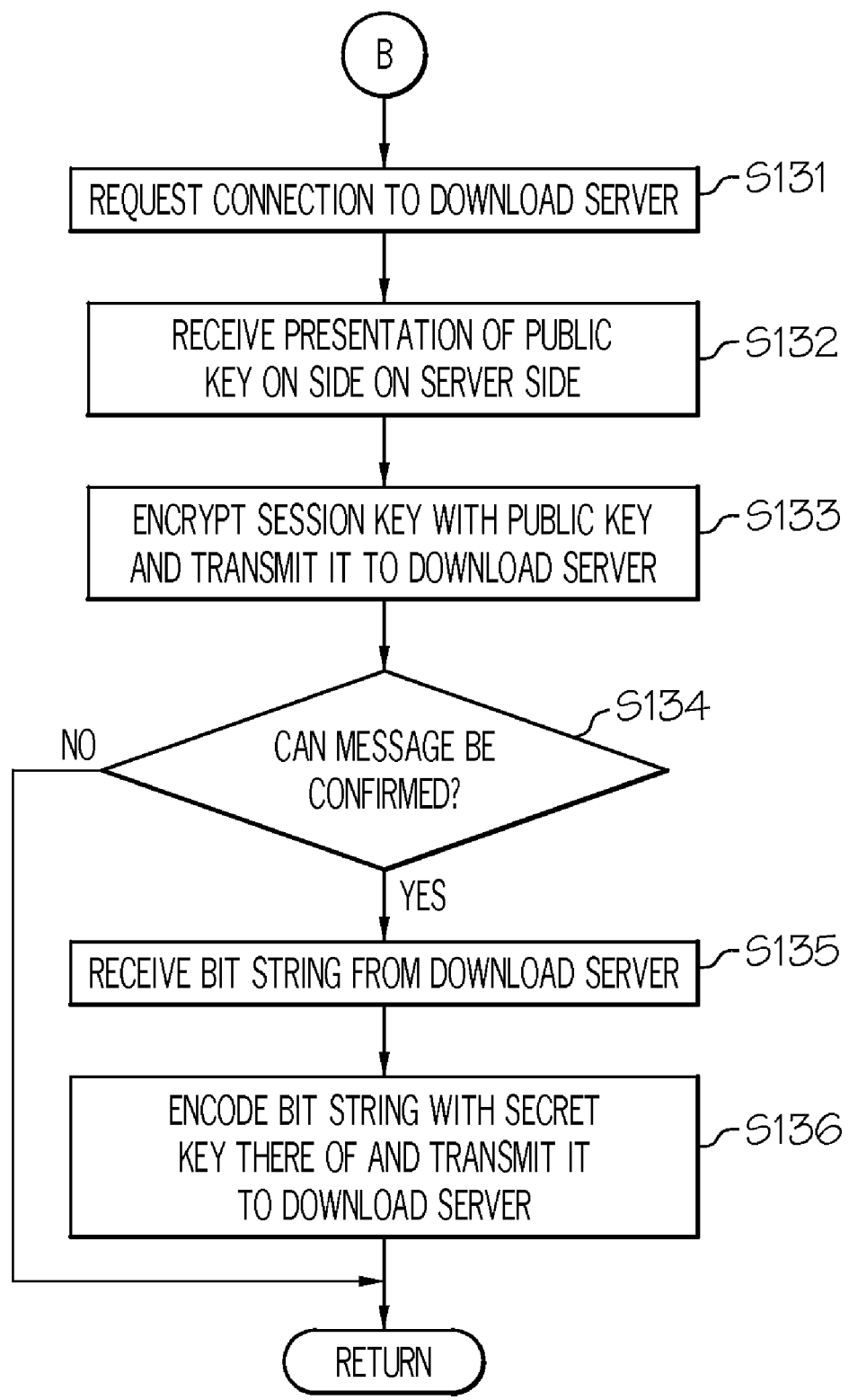
FIG. 7 is a flowchart showing detailed operations at the time when the supporting tool of the embodiment according to the present invention causes the network to be in a secured state.

For example, the authentication and encryption of the session are carried out through procedures as shown in FIG. 7.

First, the transmitting unit 415 of the computer 10 requests a connection to the download server 20 (step 131).

In response to this, the download server 20 presents a public key on a side of the server to the computer 10. In the computer 10, the receiving unit 416 receives the public key on the side of the server (step S132). The transmitting unit 415 transmits a session key (a key to encrypt actual communications), which is encrypted by the public key on the side of the server, to the download server 20 (step 133).

In response to this, the download server 20 decodes the session key with a secret key on the side of the server. All communications hereinafter is encrypted by this session key. First, the download server 20 encrypts a confirmation message to be transmitted to the computer 10.

In response to this, in the computer 10, the receiving unit 416 awaits the message from the download server 20, and determines whether or not the message is confirmed (step 134).

At this time, in a case where the message from the download server 20 cannot be confirmed, the connection is discontinued since the session key is not passed correctly.

On the other hand, in a case where the message from the download server can be confirmed, a step proceeds to the next authentication step. That is, the download server 20 forms a one-time bit string (challenge), which is encrypted by the public key of the computer 10, which is transmitted by the download server 20, and which the receiving unit 416 thus receives (step 135).

After that, the transmitting unit 415 returns a result of encoding the transmitted cipher with the secret key thereof to the download server 20 (step 136).

The download server 20 checks whether or not the returned result matches the bit string before the encryption. When the returned result matches the bit string before the encryption, authentication is successful.

As described above, the present embodiment is configured so that the supporting tool downloads the update information from the network before actual OS installation, and updates the file, which is needed for the OS installation, with the updated information, so that the file is in the latest state. Here, operation environment of the supporting tool is generally CD-ROM and RAM disks, and belongs to an environment basically different from that of the hard disk in which the OS is actually installed. In addition, a prerequisite is that the supporting tool operates on the OS (for example, Linux) different from the OS to be installed (for example, Windows). For this reason, there is no possibility that the OS, which is actually to be installed, is affected by attacks through the network. That is, it is made possible to have the latest security patch to be already applied at the time when the OS installation is completed without receiving the attacks through the network.

OS installation has been described in the present embodiment. However, the present invention can be applied to installation of general software other than OS. In this case, a similar supporting tool can also be used without a need for preparing, in the supporting medium, an OS environment for operating the supporting tool. That is, the supporting tool performs a process of causing the network to be in the secured state, downloading the security patch, and replacing the installation file with the security patch, on the OS which has been already installed in the computer 10.

In addition, the present embodiment is configured so that the security patch is applied to the software, and that the software is caused to be in the latest state of having no security problems. However, software updating is not limited for only solving the security problems. Hence, the present invention is applicable in a case where the software needs to be in the latest state for various reasons.

Figure 8:
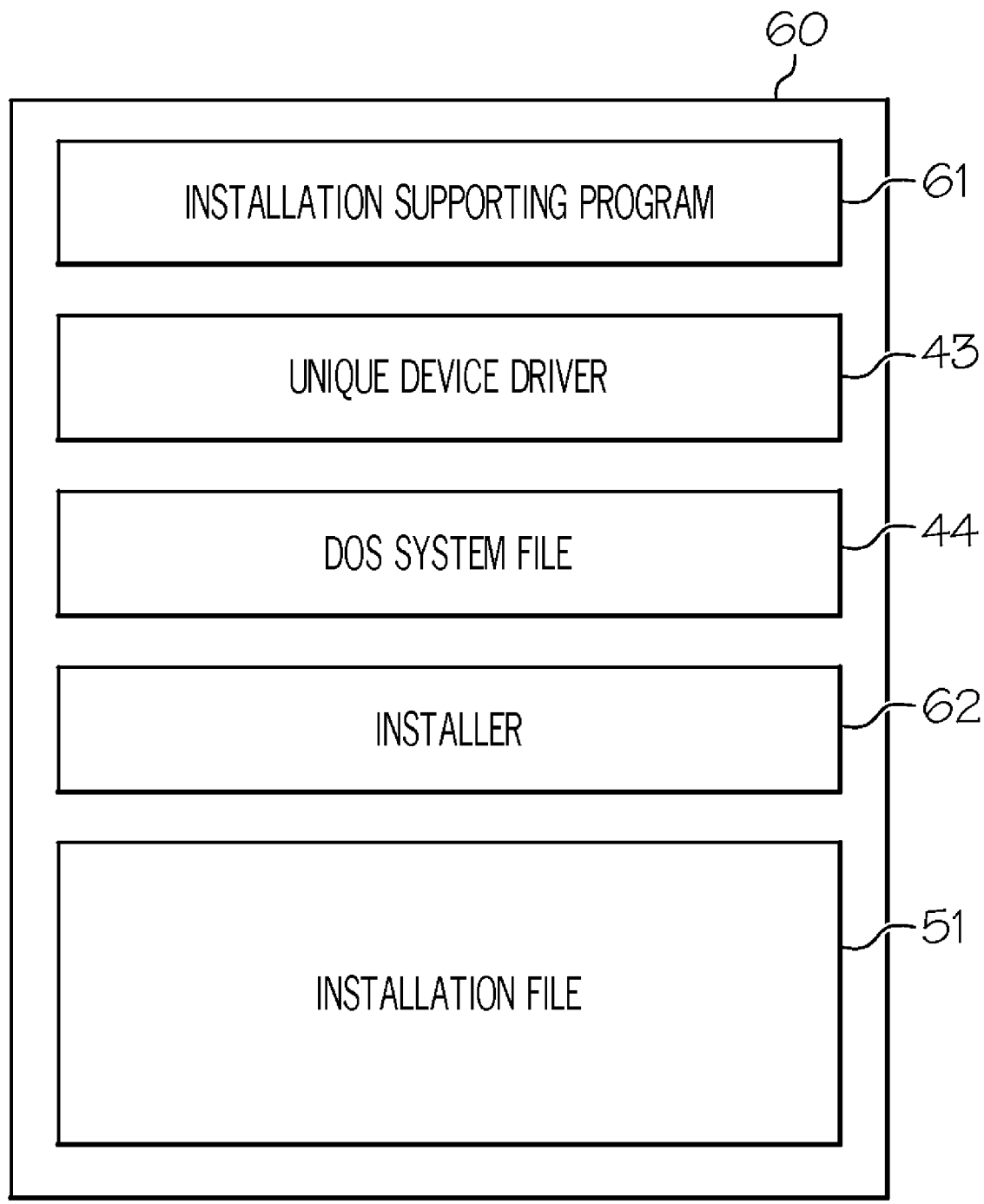
FIG. 8 is a diagram showing another example of a recording medium according to the embodiment of the present invention.

Furthermore, in the present embodiment, the prerequisite is that the supporting medium and the installation medium are independent of each other. However, the above two mediums can be collectively provided as one recording medium. FIG. 8 shows contents of data and files recorded in such recording medium. Specifically, the recording medium 60 shown in FIG. 8 records an installation supporting program 61, a unique device driver 43, a DOS system file 44, an installer 62, and an installation file 51. Among these, the installation supporting program 61, the unique device driver 43, the DOS system file 44, and the installer 62 are recorded in the supporting medium in the above-described embodiment. On the other hand, the installation file 51 is recorded in the installation medium in the above-described embodiment.

What is claimed is:

1. A method for supporting installation of a first operating system (OS) in a computing device, comprising:
　booting the computing device using a bootable storage medium containing a supporting tool operable in a second OS that is independent from the first OS;
　operating the supporting tool in the second OS on the computing device, wherein the supporting tool is configured to:
　　store a response file containing user inputted information for an unattended installation of the first OS on the computing device;
　　store an installation file for the first OS on the computing device;
　　download an update for the installation file through a network to the computing device; and
　　apply the update to the installation file to provide an updated installation file for the first OS, wherein the update causes the installation file to be in a latest state;
　removing the bootable storage medium from the computing device;
　rebooting the computing device; and
　installing the first OS on the computing device using the updated installation file and the response file, wherein the installed first OS is in a latest state.

2. The method of claim 1, wherein the update includes a security patch for correcting a security problem included in the first OS.

3. The method of claim 1, wherein, when downloading the update, the network is caused to be in a secured state, and thereafter the update is downloaded to the computing device.

4. The method of claim 3, wherein, when downloading the update, the secured state is implemented by limiting communications with a device holding the security patch to communications between specific ports.

5. The method of claim 3, wherein, when downloading the update, the secured state is implemented by encrypting communications carried out with a device holding the security patch.

6. A device for supporting installation of a first operating system (OS) in a computing device, comprising: a processor;
　a booting unit for booting the computing device using a bootable storage medium containing a supporting tool operable in a second OS that is independent from the first OS;
　a retrieving unit for operating the supporting tool in the second OS on the computing device, wherein the second OS is independent from the first OS, the supporting tool: obtaining and storing a response file containing user inputted information for an unattended installation of the first OS on the computing device; and obtaining and storing an installation file for the first OS on the computing device; downloading an update for the installation file through a network to the computing device; and applying the update to the installation file to provide an updated installation file for the first OS, wherein the update causes the installation file to be in a latest state;
　a rebooting unit for removing the bootable storage medium from the computing device; and rebooting the computing device; and
　an installing unit for installing the first OS on the computing device using the updated installation file and the response file, wherein the installed first OS is in a latest state.

7. The device of claim 6, wherein the update includes a security patch for correcting a security problem included in the first OS.

8. The device of claim 6, wherein, when downloading the update, the network is caused to be in a secured state, and thereafter the update is downloaded to the computing device.

9. The device of claim 8, wherein, when downloading the update, the secured state is implemented by limiting communications with a device holding the security patch to communications between specific ports.

10. The device of claim 8, wherein, when downloading the update, the secured state is implemented by encrypting communications carried out with a device holding the security patch.

11. A program product stored on a non-transitory computer-readable storage medium, which when executed on a computing device, supports installation of a first operating system (OS) on the computing device, the program product comprising program code for:
　booting the computing device using a bootable storage medium containing a supporting tool operable in a second OS that is independent from the first OS;
　operating the supporting tool in the second OS on the computing device, wherein the second OS is independent from the first OS, the supporting tool: obtaining and storing a response file containing user inputted information for an unattended installation of the first OS on the computing device; obtaining and storing an installation file for the first OS on the computing device; downloading an update for the installation file through a network to the computing device; and applying the update to the installation file to provide an updated installation file for the first OS, wherein the update causes the installation file to be in a latest state;
　removing the bootable storage medium from the computing device; rebooting the computing device; and
　installing the first OS on the computing device using the updated installation file and the response file, wherein the installed first OS is in a latest state.

12. The program product of claim 11, wherein the update includes a security patch for correcting a security problem included in the first OS.

13. The program product of claim 11, wherein, when downloading the update, the network is caused to be in a secured state, and thereafter the update is downloaded to the computing device.

14. The program product of claim 13, wherein, when downloading the update, the secured state is implemented by limiting communications with a device holding the security patch to communications between specific ports.

15. The program product of claim 13, wherein, when downloading the update, the secured state is implemented by encrypting communications carried out with a device holding the security patch.

* * * * *